Nov. 22, 1960  R. C. ORFORD  2,961,193
AIRCRAFT JET PROPULSION ARRANGEMENT
Filed Sept. 12, 1957  3 Sheets-Sheet 1

INVENTOR
Roy C. Orford
BY
Stevens Davis Miller & Mosher
his ATTORNEYS

Nov. 22, 1960  R. C. ORFORD  2,961,193
AIRCRAFT JET PROPULSION ARRANGEMENT
Filed Sept. 12, 1957  3 Sheets-Sheet 3

INVENTOR
Roy C. Orford
BY Stevens Davis Miller + Mosher
his ATTORNEYS

United States Patent Office 2,961,193
Patented Nov. 22, 1960

2,961,193
AIRCRAFT JET PROPULSION ARRANGEMENT

Roy C. Orford, Sevenoaks, England, assignor to Power Jets (Research and Development) Limited, London, England, a British company Filed Sept. 12, 1957, Ser. No. 683,644

Claims priority, application Great Britain Dec. 11, 1956

3 Claims. (Cl. 244—15)

This invention relates to jet propulsion of aircraft and to the employment for that purpose of engines of the so-called by-pass and ducted fan types. Such engines in operation produce two co-axial propulsive streams which, although they can be expanded through a common propelling nozzle, are in the present case, retained distinct and issued separately into the atmosphere.

It has already been proposed to issue a propulsive jet through a narrow slot nozzle in or adjacent the trailing edge of an aircraft wing and such an arrangement in which the issuing jet sheet is deflectable, e.g. over a trailing edge flap, has become known as a "jet flap" system. It is also known to blow compressed air over the upper surface of a more conventional trailing edge flap for boundary layer control purposes. In either case the desirable object is to increase the lift forces acting on the wing.

The present invention provides an aircraft lift producing and jet propulsion arrangement comprising a wing, a jet engine in operation producing two propulsive streams one within the other and ducting formed at its upstream end to confine the outer of said streams and at its downstream end to emit that stream so that it may leave the wing trailing edge in the form of an elongated thin jet sheet.

Preferably the ducting terminates in a slot nozzle situated e.g. at the wing trailing edge and that nozzle is arranged to issue a jet stream over a deflectable wing trailing edge flap.

The ducting may have an upstream portion of annular form, a bifurcated intermediate portion and a narrow slot nozzle terminating each branch of the latter. Alternatively, the ducting may have an annular upstream portion, an intermediate portion of generally crescent cross section and a single nozzle.

The engine may be mounted in the aircraft fuselage or supported by the wing. In the latter event it can be either buried within the wing or suspended by a pylon in a "pod."

Certain embodiments of the invention will now be described, by way of example only, with reference to the accompanying drawings in which.

Figure 1:
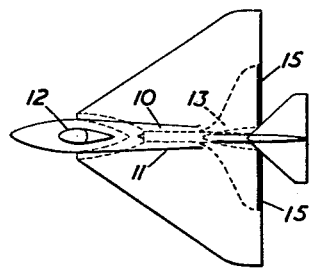
Figures 1 and 2 show respectively a small plan view of a single-engined delta wing aircraft propelled by a by-pass jet engine and an isometric tail view of part of the same aircraft.
Figure 2:
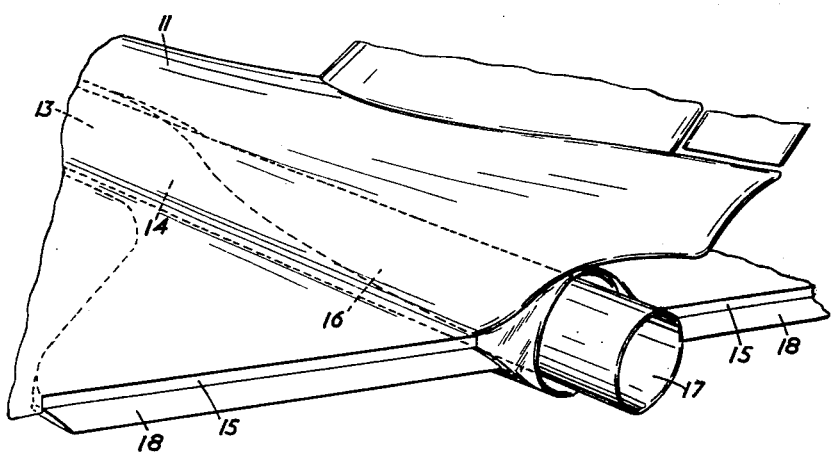

In the first embodiment, a single-engined delta-wing fighter aircraft, shown in a general plan view in Figure 1 and in more detail in Figure 2, is propelled by a by-pass gas turbine engine 10 supported within the fuselage 11 aft the cockpit 12. The engine is of conventional layout apart from the final ducting. Downstream of the turbine stages the annular by-pass duct is bifurcated along a vertical line through the engine longitudinal axis. The by-pass ducting thereby assumes the form of two semi-annular branches 13 which are each transformed by gradual shaping 14 so as to pass out of the fuselage into a wing through a wing root fillet to terminate at a slot nozzle 15 at the inboard trailing edge of the wing. The propulsive stream from the main turbine continues through a circular section jet pipe 16 towards a nozzle 17 in the rear of the fuselage.

The slot nozzles are each equipped throughout their span with a trailing edge flap 18 arranged so that the respective by-pass propulsive streams issue over the upper flap surfaces. These flaps are pivoted so that by Coanda effect the propulsive streams can be deflected from their normal rearward jet direction. For instance, the deflection of the by-pass streams downwards, say through an angle of about 60° relative to the rearward jet direction, affects the whole flow of air over at least the inboard parts of the wings and results in considerable increase of lift. The flaps need only have a chordal extent sufficient in operation to turn the propulsive streams as a whole without substantial separation thereof. Hence they can be much narrower than conventional flaps.

Figure 3:
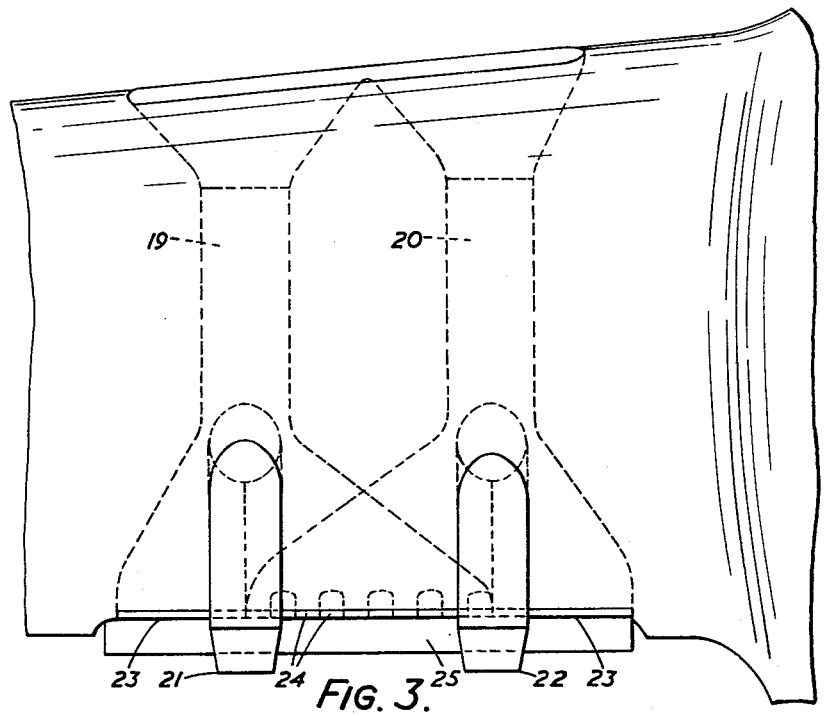
Figure 3 shows a plan view of part of an aircraft wing having two adjacent by-pass jet engines mounted in the wing.

In a second embodiment of the invention shown in Figure 3 the same general idea is applied to a multi-engined airliner. The aircraft is equipped with four by-pass engines buried in the wings near their roots. Each engine 19, 20 has its by-pass duct bifurcated as described above and led to slot nozzles which extend along the wing trailing edge on both sides of the engine. The main jet pipe projects beyond the trailing edge and preferably, as shown, leaves the wing at 21, 22 a little above the trailing edge so that the slot nozzles 23 can extend towards one another beneath the main jet pipe and nozzle. Moreover, the adjacent slot nozzles from the two engines in a wing are interdigitated at 24 so that the by-pass flow from each is spread along about three quarters of the total slot nozzle length. The effect of dividing the by-pass streams is to provide a long narrow propulsive jet extending spanwise along the trailing edge substantially continuously from outboard of the outboard engine to inboard of the inboard engine. This long nozzle is provided with a deflectable short chord trailing edge flap 25 for purposes similar to those described above in relation to the first embodiment.

Figure 4:
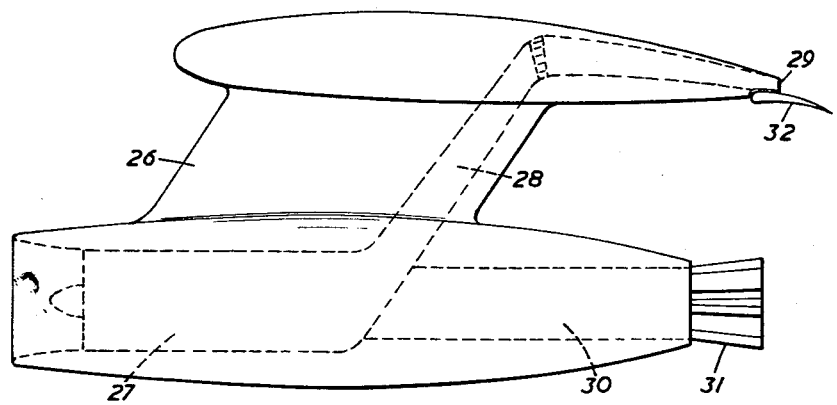
Figures 4 and 5 show respectively a side elevation of a wing supporting a "podded" by-pass jet engine and a rear elevation of the same engine and wing arrangement the latter view disclosing the lateral positioning of the slot nozzle through which the by-pass stream is issued compared with the main jet pipe.
Figure 5:
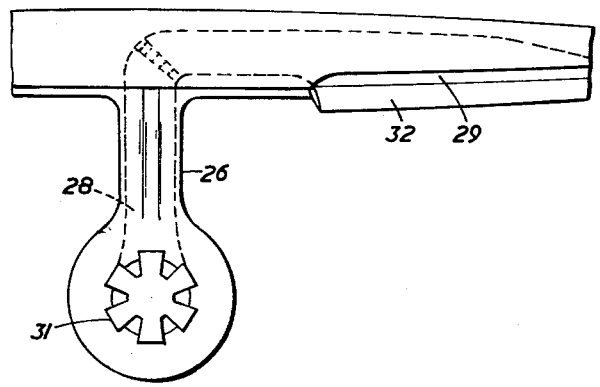

In some circles, it is the fashion to support jet engines below an aircraft's wings in so-called "pods." Two further embodiments of the inventoin are concerned with such an arrangement in which by-pass engines are employed. Reference is directed to Figures 4 and 5 and to Figure 6. The podded engines are each supported by a streamlined, elongated and hollow pylon 26 through which the fuel supply and controls pass to the engine 27. The pylon is also utilised at its rearward end in the first "pod" embodiment to convey through a duct 28 the by-pass stream from the engine into the wing proper, wherein the duct is flattened into a generally fish-tail shape to terminate in a slot nozzle 29 extending along the wing trailing edge. The annular by-pass duct of the engine is interrupted by an upstream facing wall lying in a plan oblique to the engine axis and with its apex on a vertical line through and below that axis. In cross-section, therefore, the by-pass duct changes from annular to generally crescent shaped. The by-pass stream is collected from this crescent shaped duct and passed into the pylon duct.

The main engine jet pipe 30 emerges from the rear end of the pod and is preferably equipped with a noise suppressor 31.

The slot nozzle in the wing trailing edge is again equipped with a trailing edge flap 32 so that a deflectable jet sheet may be provided. Preferably the slot nozzle is asymmetrically offset from the main engine nozzle as is shown in Figure 5, so that the jet sheet when deflected downwards does not interfere with the main jet leaving the engine. Normally the slot nozzle extends inwards from the wing position of the engine.

In an aircraft with four podded engines, a convenient arrangement is one in which the two inboard ones are of the by-pass type and are arranged as described above and the outboard ones are jet engines, not necessarily of the by-pass type and not provided with associated slot nozzles.

Figure 6:
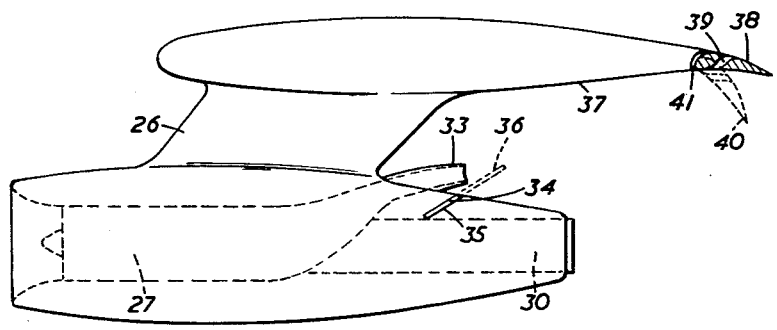
Figure 6 is a view of an alternative "podded" arrangement the by-pass stream issuing through a nozzle above the pod.

The second "pod" embodiment shown in Figure 6 has its by-pass engine arranged generally as in the Figure 4 and 5 embodiment, but the by-pass stream is not taken into the pylon 26. Instead it is expanded through a separate nozzle 33 of greater width than depth situated above the upper rear surface of the pod. Associated with this nozzle 33 is a plate jet deflector 34 normally retracted into a slot 35 in the pod. In its operated position, shown dotted at 36, it protrudes into the by-pass jet stream immediately after issuance from the nozzle 33 and that stream is deflected upwards to impinge upon the wing lower surface 37, just forward of a trailing edge flap 38. The flap which is shown diagrammatically in section has an inclined passage 39 in it, which is elongated in the spanwise direction. The action of the deflector 34 is interconnected with that of the flap 38, so that on, or slightly following, the operation of the deflector 34 the flap 38 can be lowered, for example to the position shown dotted at 40. In this condition the by-pass stream is first deflected upwards to meet the under-surface 37 of the wing; some of the stream is baulked by the lowered flap 40 and is deflected downwards in the normal flap operation manner and some passes through the passage 39 to emerge over the upper surface of the flap 38 as a long thin jet sheet deflected by Coanda effect. Both contribute to an increase of lift on the wing. The flap mechanism may be arranged so that, on lowering of the flap, a part of the by-pass stream passes through a gap 41 between the wing and the flap. This may be alternative to or in addition to a stream reaching the upper surface of the flap via a slot passage 39 in it.

Wherever a slot nozzle on one side of the aircraft fuselage is fed from an engine different from that feeding a similar nozzle on the other side, it is advisable to interconnect the control and fuel supplies of the respective engines so that, should one fail in any way, its action will be matched by the interconnected engine, thus reducing the risk of asymmetrical lift or thrust.

As one normal advantage of a by-pass engine is its comparative quietness and as this is believed to be due to the annular low velocity stream of relatively cool compressed air surrounding the hot main jet, the removal of the air sheath to pass through a separate slot nozzle will probably make it more desirable, as is suggested above in connection with the Figure 4 and 5 embodiment, to fit a noise suppressing nozzle to the end of the main jet pipe. The by-pass stream should issue quietly from the slot nozzle for the peripheral length is large and the velocity low.

Reference has been made above to slot nozzles in the wing trailing edge. Alternatively such slot nozzles may be positioned somewhat forward of but generally parallel to the trailing edge and in the upper surface of the wing.

The embodiments have specified the employment of by-pass engines, for these are presently available. It will be appreciated, however, that other engines producing two co-axial propulsive streams may be employed: an instance is the so-called ducted fan engine of the kind built in the past. Such engines had a bladed thrust augmenter in an annular duct surrounding the turbine stages of the main engine. Some at least of those stages drove the augmenter fan. This possibility is quoted so that the invention may not be considered in an unnecessarily limited light.

I claim:

1. An aircraft including a wing having leading and trailing edges, two jet propulsion engines, an inner propulsive gas duct and an outer propulsive gas duct in each engine, a slot nozzle at the trailing edge of the wing, and ducting leading from the outer duct of each engine to the slot nozzle, the ducting connected to the outer duct of the one engine at least partly interdigitating with the ducting leading from the outer duct of the other engine in the region of the slot nozzle.

2. An aircraft as claimed in claim 1, in which the ducting leading from the outer duct of the one engine is connected to supply approximately three-quarters of the spanwise extent of the slot nozzle and the ducting leading from the outer duct of the other engine is also connected to supply approximately three-quarters of the spanwise extent of the slot nozzle, approximately a half of the spanwise extent of the slot nozzle being commonly supplied by both engines.

3. An aircraft including a wing having trailing and leading edges, two gas turbine by-pass jet propulsion engines, a slot nozzle at the trailing edge of the wing, and ducting leading the by-pass stream of each engine to the slot nozzle, the ducting connected to the one engine at least partly interdigitating with the ducting connected to the other engine in the region of the slot nozzle.

References Cited in the file of this patent

UNITED STATES PATENTS

| | | |
|---|---|---|
| 1,389,797 | Thompson | Sept. 6, 1921 |
| 2,568,813 | Lundberg | Sept. 25, 1951 |
| 2,654,552 | Jonas | Oct. 6, 1953 |
| 2,761,634 | Velazquez | Sept. 4, 1956 |

FOREIGN PATENTS

| | | |
|---|---|---|
| 768,044 | Germany | May 26, 1955 |
| 1,105,339 | France | June 29, 1955 |